(12) United States Patent
Roberge et al.

(10) Patent No.: US 10,681,852 B2
(45) Date of Patent: Jun. 16, 2020

(54) HYBRID TILLAGE IMPLEMENT FOR VERTICAL TILLAGE AND AERATION OF SOIL

(71) Applicant: CNH Industrial Canada, Ltd., Saskatoon (CA)

(72) Inventors: Martin J. Roberge, Saskatoon (CA); Kevin N. Hall, Saskatoon (CA)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 0 days.

(21) Appl. No.: 15/407,870

(22) Filed: Jan. 17, 2017

(65) Prior Publication Data

US 2018/0199497 A1 Jul. 19, 2018

(51) Int. Cl.
*A01B 49/02* (2006.01)
*A01B 45/02* (2006.01)

(52) U.S. Cl.
CPC .......... *A01B 49/027* (2013.01); *A01B 45/02* (2013.01); *A01B 49/02* (2013.01)

(58) Field of Classification Search
CPC ...... A01B 49/027; A01B 29/048; A01B 45/02
USPC ........................................................ 172/151
See application file for complete search history.

(56) References Cited

U.S. PATENT DOCUMENTS

| | | | | |
|---|---|---|---|---|
| 417,421 A * | 12/1889 | Hesse | .................. | A01B 49/027 172/146 |
| 1,088,075 A * | 2/1914 | Johnson | ................. | A01B 35/12 172/146 |
| 1,926,976 A * | 9/1933 | Engle | ..................... | A01B 49/00 172/137 |
| 2,204,569 A * | 6/1940 | Bushong | .............. | A01B 17/004 172/151 |
| 2,325,997 A * | 8/1943 | Kelly et al. | ............ | A01B 13/10 172/545 |
| 2,580,236 A * | 12/1951 | Mascaro | ................ | A01B 45/02 111/89 |
| 2,959,231 A | 11/1960 | Heilman | | |
| 3,941,193 A * | 3/1976 | Shoemaker | .......... | A01B 33/021 172/106 |
| 4,102,406 A * | 7/1978 | Orthman | ................ | A01B 13/16 172/177 |
| 4,127,178 A * | 11/1978 | Blair | .................... | A01B 23/046 172/178 |

(Continued)

OTHER PUBLICATIONS

"Ripper/Aerator" taken from http://lyndonengineering.co.nz/harrows/ripper-aerator/, Lyndon Engineering & Harrows, 2015 (3 pages).

(Continued)

*Primary Examiner* — Thomas B Will
*Assistant Examiner* — Joel F. Mitchell
(74) *Attorney, Agent, or Firm* — Rebecca L. Henkel; Rickard K. DeMille

(57) ABSTRACT

An agricultural tillage implement has a vertical tillage section and an aerating section behind the vertical tillage section, each extending substantially perpendicular to the pull direction of the implement. Individual vertical tillage elements, such as disc blades, can be indexed with individual rotary tine assemblies of the aerator section so that discrete holes formed by the aerator section are positioned between substantially continuous slits formed by the vertical tillage section. Rolling baskets can be provided behind the aerator section for further soil conditioning.

8 Claims, 3 Drawing Sheets

(56) References Cited

U.S. PATENT DOCUMENTS

| | | | | |
|---|---|---|---|---|
| 4,180,005 A | * | 12/1979 | Zumbahlen | A01B 49/04 111/52 |
| 4,333,250 A | | 6/1982 | Henderson | |
| 4,361,191 A | | 11/1982 | Landoll et al. | |
| 5,209,306 A | * | 5/1993 | Whitfield | A01B 45/02 172/118 |
| 5,520,253 A | | 5/1996 | Kesting | |
| 5,622,227 A | * | 4/1997 | McDonald | A01B 49/027 172/146 |
| 5,623,996 A | * | 4/1997 | Postema | A01B 45/02 172/118 |
| 5,713,420 A | | 2/1998 | Roberts et al. | |
| 5,765,645 A | * | 6/1998 | Postema | A01B 35/26 172/21 |
| 5,797,460 A | | 8/1998 | Parker et al. | |
| 6,554,078 B1 | * | 4/2003 | McDonald | A01B 25/00 172/146 |
| 6,698,525 B2 | * | 3/2004 | McFarlane | A01B 49/027 172/145 |
| 7,048,069 B1 | | 5/2006 | Bollich | |
| 7,762,345 B2 | * | 7/2010 | Rozendaal et al. | A01B 35/16 172/573 |
| 8,079,425 B1 | | 12/2011 | Van Kooten et al. | |
| 8,627,898 B2 | | 1/2014 | Nance | |
| 9,192,091 B2 | | 11/2015 | Bassett | |
| 2012/0111588 A1 | | 5/2012 | Smith et al. | |
| 2014/0123885 A1 | | 5/2014 | Nance | |
| 2014/0166320 A1 | | 6/2014 | Olsen | |
| 2014/0262370 A1 | * | 9/2014 | Kohn et al. | A01B 49/027 172/140 |

OTHER PUBLICATIONS

"Terraland Do" Bednar Farm Machinery, taken from http://www.bednar-machinery.com/en/produkty/detail/397/terraland-do, Feb. 24, 2016 (3 pages).

* cited by examiner

HYBRID TILLAGE IMPLEMENT FOR VERTICAL TILLAGE AND AERATION OF SOIL

BACKGROUND OF THE INVENTION

1. Field of the Invention

The present invention relates to agricultural implements, and, more particularly, to agricultural field tillage implements. Still more particularly the invention pertains to tillage implements that combine multiple tilling operations in a single unit, including vertical tillage and aerating.

2. Description of the Related Art

Farmers utilize a wide variety of tillage implements to prepare soil for planting. Common tilling operations include plowing, harrowing and sub-soiling, which are performed by pulling a tillage implement behind a motorized tractor. A farmer may need to perform several tilling operations at different times over a crop cycle to properly cultivate the ground to suit the crop choice and soil conditions. Some such implements include two or more sections coupled together to perform multiple functions as the implement is pulled through the field. For example, a cultivator/harrow is capable of simultaneously tilling and leveling the soil in preparation for planting. This implement includes a cultivator that is towed by a tractor and a harrow that is towed by the cultivator.

In one type of tilling operation, vertical tillage, rows or gangs of circular disc blades are pulled through the soil at variable depths to break up clods or lumps of soil, as well as old plant material to provide a more amenable soil structure for planting and to level the soil surface. The gangs of discs are arranged on frames that extend generally laterally with respect to the direction of movement through a field and more particularly are angled with respect to the direction of movement. It is known to angle a first set outward and a following set inwardly so that soil moved outwardly by the first set is returned inwardly by the following set.

While the use in a tilling operation of multiple angled gangs of discs with relatively sharp edges has been effective particularly for cutting plant residue, it is not without problems. An increased gang angle can leave large clods of soil that may require multiple passes to pulverize. The side pressure of the soil against the sides of flat or shallow discs can break the discs. Increasing the concavity of the discs to improve their strength promotes the formation of an undesirable compaction layer. Multiple passes of the tillage implement over the same area of soil may be required to properly cultivate the soil and cut through heavy crop residue. If multiple passes are required, the farmer incurs increased costs associated with the amount of time and fuel required to prepare the seedbed. The discs being angled relative to the travel direction of the implement can establish greater resistance, requiring more power for the tilling operation.

The use of cultivators also can be problematic. Cultivators can compact the soil under the prepared seedbed. A layer of compacted soil inhibits plant germination, root growth, and crop yield. The presence of a compacted layer of soil may require an additional tillage operation such as plowing to break up the compacted earth in order to avoid the problems of poor water absorption and weak anchoring of crops in the ground.

Decompaction and aeration are used sometimes in pasture lands or fields after harvesting forage or cereals to increase the level of oxygen absorbed by the soil to increase crop growth. It is not always necessary to significantly disturb the soil, just open the soil to allow better penetration of air, water and added nutrients. Accordingly, it is sometimes desirable to condition and improve the soil without substantially disturbing the soil.

Thus, there is a need for a tillage implement that is capable of cutting plant residue effectively and tilling the soil in a single pass without excessively disturbing the soil.

SUMMARY OF THE INVENTION

The present invention provides a tillage implement having discs oriented perpendicular to or at a shallow angle to perpendicular followed by rotary aerator tines to break soil and plant material and improve soil oxygenation with minimal soil disruption.

In one form, the hybrid tillage implement provides a main frame including a pull hitch extending in a travel direction; a vertical tillage section carried by the frame extending generally laterally with respect to the travel direction; and an aerating section carried by the frame behind the vertical tillage section, the aerating section extending generally laterally with respect to the travel direction The aerating section includes individual tines to create discrete holes in ground being tilled.

In another form, the hybrid tillage implement is provided with a main frame including a pull hitch extending in a travel direction; a row of disc blades carried by the frame and extending generally laterally to the travel direction, and a row of rotary tine assemblies carried by the frame behind the row of disc blades and extending generally laterally to the travel direction. The row of rotary tine assemblies includes individual tines to create discrete holes in the ground being tilled.

In still another form, the hybrid tillage implement is provided with a main frame including a pull hitch extending in a travel direction; a row of disc blades carried by the main frame in a disc blade left row and a disc blade right row extending generally laterally to the travel direction and substantially symmetric about a centerline of the implement; and a row of rotary tine assemblies carried by the main frame in a tine assembly left row behind the disc blade left row and a tine assembly right row behind the disc blade right row. The tine assembly left row and the tine assembly right row extend generally laterally to the travel direction and substantially symmetric about the centerline of the implement.

An advantage of the hybrid tillage implement disclosed herein is that the soil and residue can be conditioned without being substantially disturbed.

Another advantage of the hybrid tillage implement is that the implement will pull through the ground more easily.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one embodiment of the invention and such exemplification is not to be construed as limiting the scope of the invention in any manner.

DETAILED DESCRIPTION OF THE INVENTION

Figure 1:
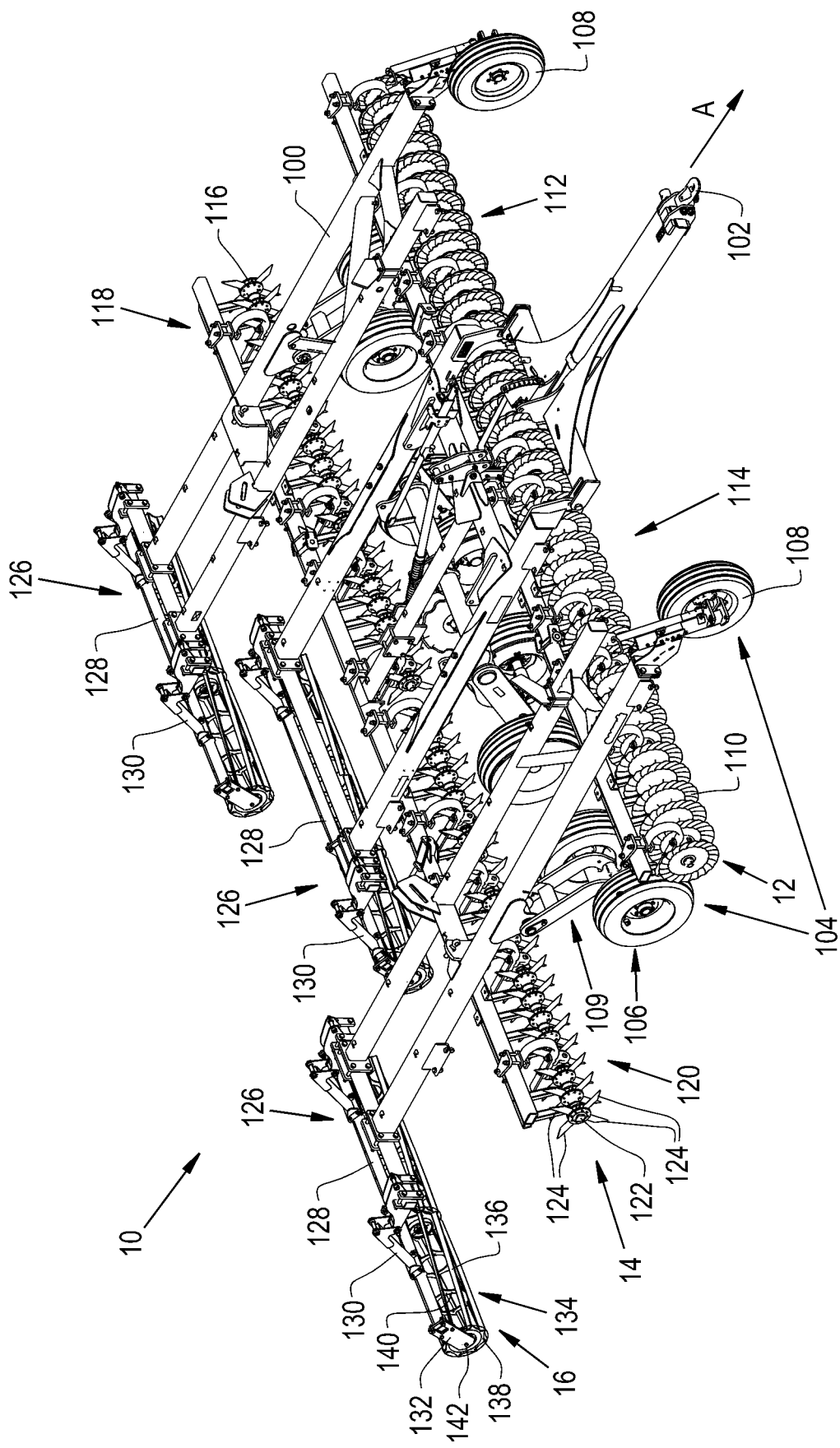
FIG. 1 is a perspective view of a hybrid tillage implement as disclosed herein.

Referring to FIG. 1, a tillage implement 10 is shown. An agricultural vehicle (not shown) pulls the tillage implement 10 in a travel direction A. The tillage implement 10 of the exemplary embodiment shown includes a vertical tillage section 12 at the front thereof, an aerating section 14 following behind vertical tillage section 12 and a soil conditioning section 16 behind aerating section 14. Vertical tillage section 12, aerating section 14 and soil conditioning section 16 are generally symmetrically arranged about a centerline 18 of implement 10. Vertical tillage section 12 is provided for generally breaking large clumps or clods of dirt and plant material, cutting or breaking plant residue such as stalks, stems or large leaves and cutting generally continuous slits in the soil surface. Aerating section 14 is provided for creating discrete spaced openings in the soil between the slits created by the vertical tillage section. Soil conditioning section 16 smoothens and evens the soil surface while providing additional crumbling or breaking of clumps or conglomerated soil or plant matter. In some applications and uses, implement 10 may include only vertical tillage section 12, with one or two gangs of discs, and aerating section 14.

Figure 2:
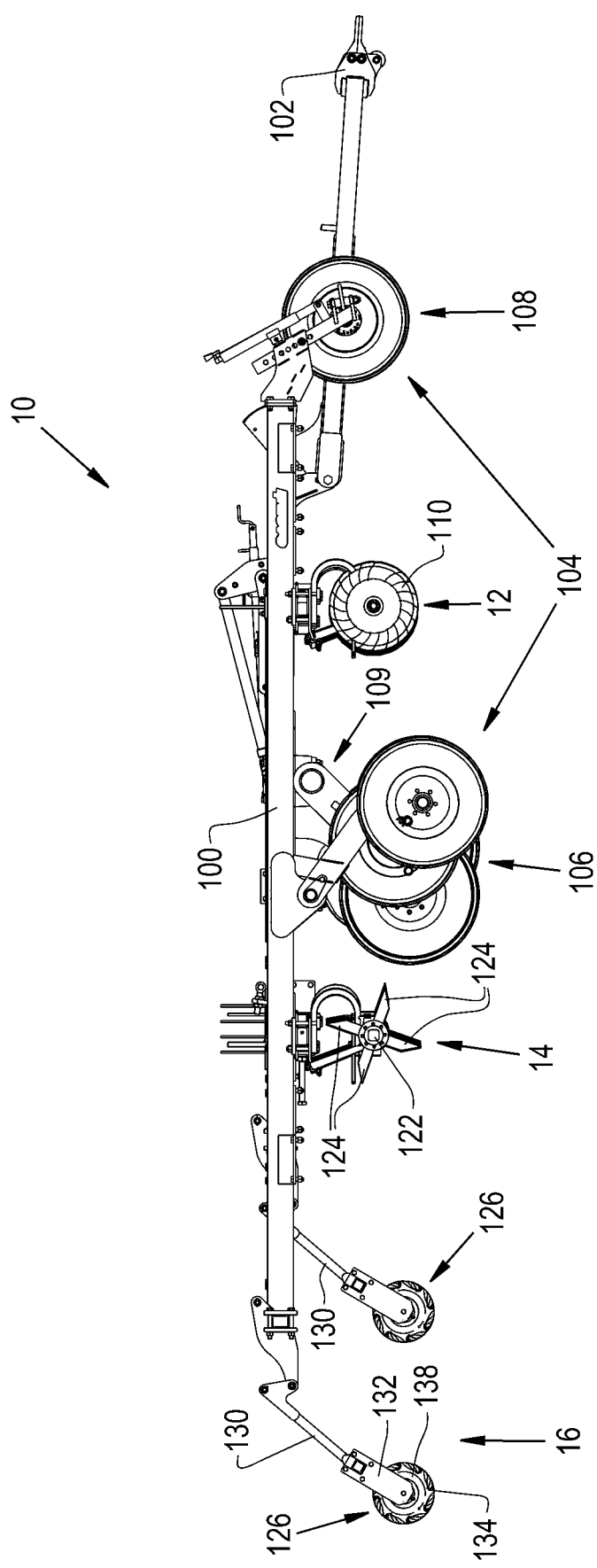
FIG. 2 is a side elevational view of the hybrid tillage implement shown in FIG. 1.
Figure 3:
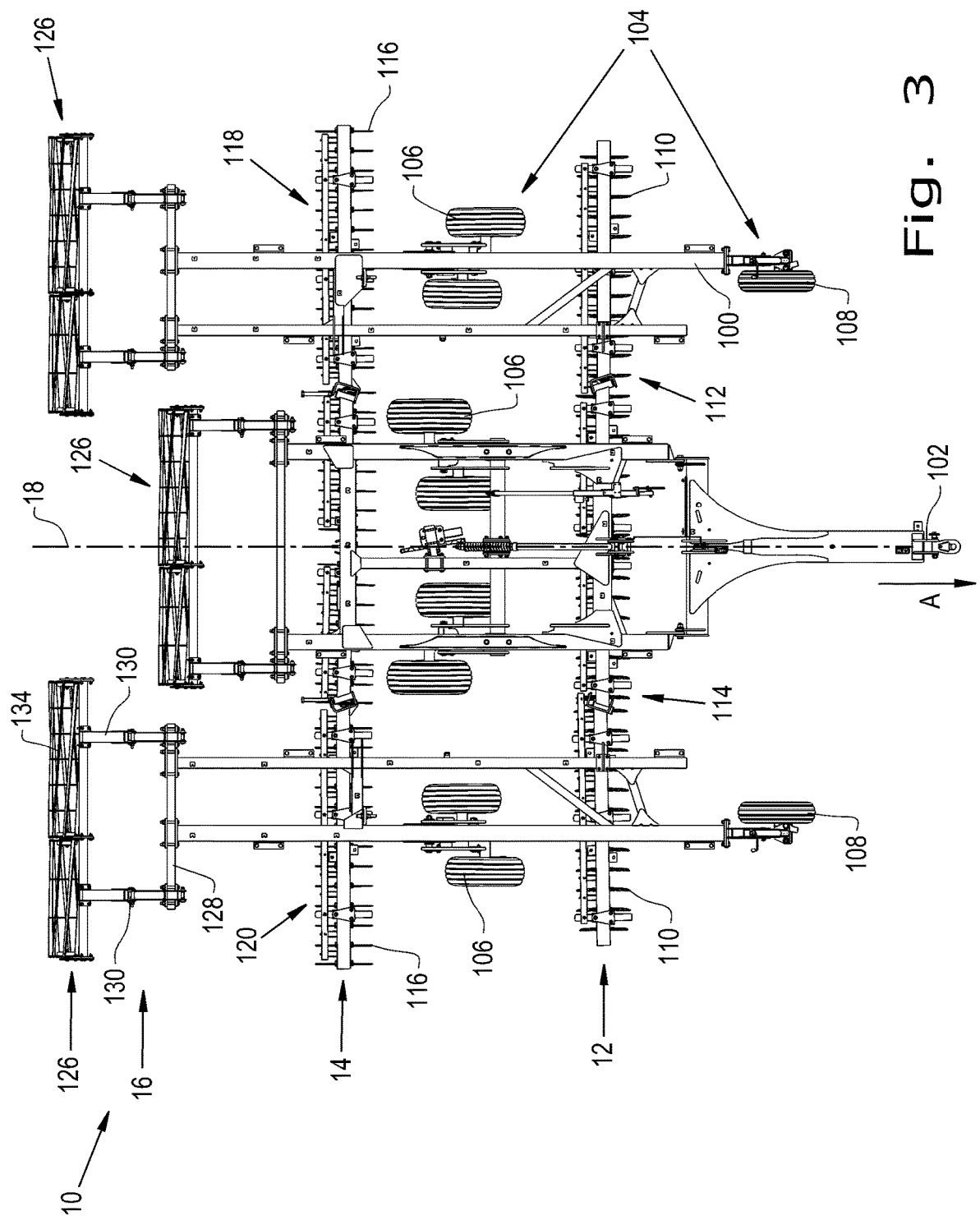
FIG. 3 is a top view of the hybrid tillage implement.

Referring now additionally to FIGS. 2 and 3, implement 10 includes a main frame 100 having a hitch 102 on the front end that may be used to connect the tillage implement 10 to an agricultural vehicle, such as a tractor. Vertical tillage section 12, aerating section 14 and finishing section 16 are connected to and carried by mainframe 100. A set of wheels 104 is connected to main frame 100 and oriented in a direction that is in general alignment with the travel direction A. The set of wheels 104 includes center wheels 106 and pivoting wheels 108. Center wheels 106 are attached across the main frame 100 at positions, for example, roughly midway between the front and rear ends of the main frame 100. The center wheels 106 may include a system 109 for adjusting the distance between the main frame 100 the center wheels 106. The system 109 for adjusting may permit the center wheels 106 to be statically fixed during the movement of the tillage implement 10 or to be dynamically adjustable as the tillage implement 10 travels. The pivoting wheels 108 are connected to the front outer ends of the main frame 100. The pivoting wheels 108 may include at least two pivoting wheels that reduce the amount of lateral movement of tillage implement 10 as it is pulled.

Vertical tillage section 12 includes a row of individual concave, sharpened and grooved disc blades 110 attached to the main frame 100. In accordance with one configuration, the row of concave disc blades 110 includes a disc blade left row 112 and a disc blade right row 114. In the configuration shown in FIG. 1, the disc blade left row 112 is symmetric about a centerline 18 of the tillage implement 10 with the disc blade right row 114. Disc blade left row 112 and disc blade right row 114 are substantially perpendicular to centerline 18, but can be provided also at an angle. Perpendicular orientation to the direction of travel reduces the power requirement for operation; however, in some instances a slight angle of up to about five degrees from perpendicular can be used without substantially increasing the power requirement.

The individual disc blades 110 of disc blade left row 112 and disc blade right row 114 can be of types well known to those skilled in the art, such as fluted blades, serrated blades, smooth blades or the like. In some preferred applications and uses, the individual blades of disc blade left row 112 and disc blade right row 114 have substantially thin or sharpened edges so as to cut through and/or break up crop residue such as stalks, stems and large leaves, as well as clumps or clods of roots and soil. Further, while disc blades 110 are shown for vertical tillage section 12, it should be understood that other types of tillage devices can be used, such as cultivator shoes or the like.

Aerating section 14 includes a row of rotary tine assemblies 116 attached to the mainframe 100. In accordance with one configuration, the row of rotary tine assemblies 116 includes a tine assembly left row 118 and a tine assembly right row 120. In the configuration shown, the tine assembly left row 118 is symmetric about centerline 18 of the tillage implement 10 with the tine assembly right row 120. Tine assembly left row 118 and tine assembly right row 120 are substantially perpendicular to centerline 18. The individual rotary tine assemblies 116 of rotary tine assembly left row 118 and rotary tine assembly right row 120 each include a hub or body 122 and four individual tines 124 radiating therefrom in equally spaced arrangement. The individual tines 124 are configured to pierce the soil to open discrete holes therein, to facilitate penetration of water, nutrients and air.

Vertical tillage section 12 and aerating section 14 can be indexed one with the other such that the individual rotary tine assemblies 116 of tine assembly left row 118 operate in the spaces between adjacent individual disc blades 110 of disc blade left row 112, and the individual rotary tine assemblies 116 of tine assembly right row 120 operate in the spaces between adjacent individual disc blades 110 of disc blade right row 114. Accordingly, elongated slits formed by individual disc blades 110 alternate with rows of discrete holes formed by individual tines 124 in a tilling pass made by implement 10.

Soil conditioning section 16 includes rolling basket assemblies 126 connected to the rear end of the main frame 100, behind aerating section 14. Although three rolling basket assemblies 126 are shown in the exemplary embodiment, two of which are shown having rotational axes collinear with one another but not collinear with the third rolling basket assembly 126, the soil conditioning section 16 may include fewer or more individual rolling basket assemblies 126.

Rolling basket assemblies 126 are connected to the main frame 100 by a system of beams 128 and arms 130 extending rearward from the main frame 100 and downwardly to engage the rolling basket assemblies 126. Each rolling basket assemblies 126 includes a frame 132 connected to arms 130 and to the ends of a rolling basket 134. The rolling basket 134 is formed by a plurality of bars 136, which may be arranged helically, and which extend between end caps 138 and around a set of supporting framework rings 140. The end caps 138 engage a rotational coupling 142 to allow the rolling baskets 134 of rolling basket assemblies 126 to rotate.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural tillage implement, comprising:
   a main frame including a pull hitch extending in a travel direction;
   a vertical tillage assembly including a plurality of disc blades carried by the main frame and extending generally laterally with respect to the travel direction;
   an aerating assembly including a plurality of rotary tine assemblies operably carried by the main frame behind the vertical tillage assembly, the plurality of rotary tine assemblies extending generally laterally with respect to the travel direction, wherein each rotary tine assembly of the plurality of rotary tine assemblies includes a plurality of individual tines, each individual tine of each rotary tine assembly connected to a hub, each hub of each rotary tine assembly connected via an arm which connects to and extends a distance from a rotary tine assemblies frame carried by the main frame, the plurality of individual tines are positioned about each hub such that each individual tine creates a separate discrete hole for aeration in the ground being tilled, such that the plurality of individual tines positioned about each hub does not form a continuous slit through the ground being tilled, wherein each individual tine on each hub is positioned in its entirety at a 90 degree angle relative to each tine on either side thereof, wherein each individual tine is formed as a knife with one edge of the tine having a slope at the free end toward an opposing edge of the tine, creating a knife point at a free end of each individual tine, and wherein opposing rotary tines positioned about each hub of each rotary tine assembly are in a longitudinal alignment relative to each other, the longitudinal alignment extending through each connected end and each free end of each opposing rotary tine; and
   a soil conditioning assembly including a plurality of rolling basket assemblies positioned behind the plurality of rotary tine assemblies to smooth the oil.

2. The agricultural tillage implement of claim 1, wherein the plurality of disc blades are arranged in a disc blade left row and a disc blade right row symmetric about an implement centerline.

3. The agricultural tillage implement of claim 1, wherein the plurality of rotary tine assemblies are arranged in a rotary tine assembly left row and a rotary tine assembly right row symmetric about a centerline of the implement.

4. The agricultural tillage implement of claim 3, wherein individual disc blades of the plurality of disc blades form a substantially continuous slit through ground being tilled.

5. The agricultural tillage implement of claim 4, wherein the plurality of disc blades and the plurality of rotary tine assemblies are indexed so that the plurality of rotary tine assemblies operate in ground between the paths of the plurality of disc blades.

6. The agricultural tillage implement of claim 1, wherein the plurality of disc blades and the plurality of rotary tine assemblies are substantially perpendicular to the travel direction.

7. The agricultural tillage implement of claim 6, wherein the plurality of disc blades and the plurality of rotary tine assemblies are substantially parallel to one another.

8. The agricultural tillage implement of claim 1, wherein the plurality of disc blades and the plurality of rotary tine assemblies are provided in left rows and right rows symmetric about a centerline of the implement.

* * * * *